May 9, 1950     H. J. KLEIN     2,507,376
SKID CHAIN APPLYING CLAMP
Filed Nov. 18, 1947
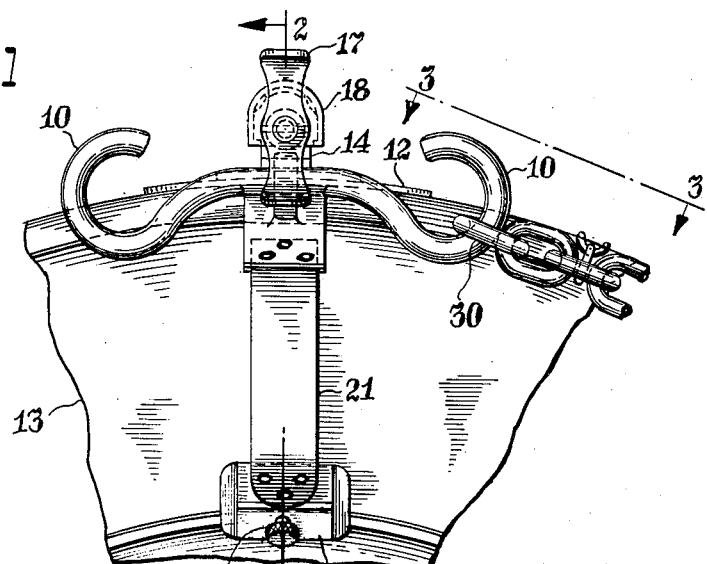
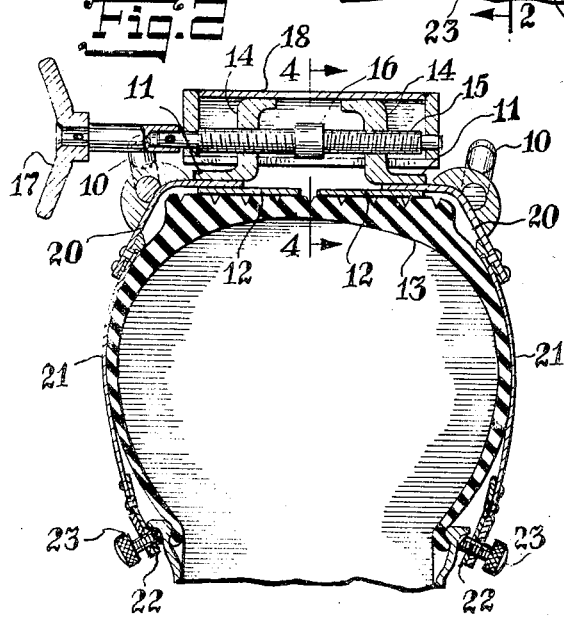
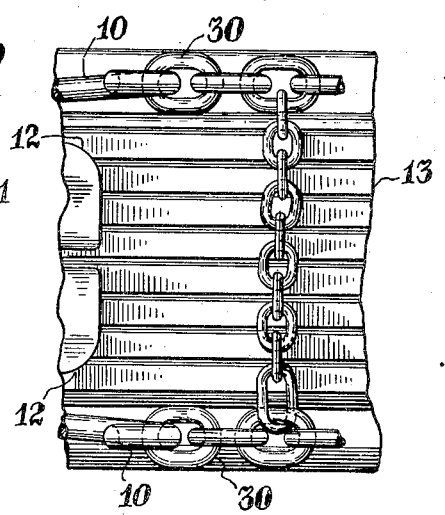
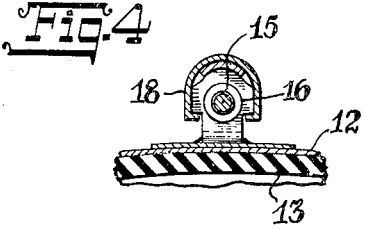
INVENTOR.
HARRY J. KLEIN
BY *Peter M. Boesen*
ATTORNEY Patented May 9, 1950

2,507,376

UNITED STATES PATENT OFFICE 2,507,376

SKID CHAIN APPLYING CLAMP

Harry J. Klein, Yonkers, N. Y.

Application November 18, 1947, Serial No. 786,713

1 Claim. (Cl. 81—15.8)

This invention relates to new and useful improvements in automobile skid chain guides, and it has for its object to provide guiding means which will greatly facilitate the attaching of skid chains to automobile wheels, especially in case of the newer cars, where the mud guards, or side pieces, extend far downwardly, and to a considerable degree cover the sides of the wheels of the car.

By using the skid chain guides hereinafter described, said skid chains can be attached to a wheel in no time and without any great effort.

As, in addition, my device is comparatively simple of construction, the cost of same is proportionally low.

With the above and other objects in view, this invention consists of the novel features of construction, combination and arrangement of parts, hereinafter fully described, claimed and illustrated in the accompanying drawings forming part of this application, and in which similar characters of reference indicate corresponding parts in all views, and in which:

Figure 1 is an elevational view of my device, showing the latter mounted on a tire, part of which has been broken off, and showing also a skid chain in course of being attached to said tire.

Figure 2 is a transverse sectional view, taken on the line 2—2 in Figure 1.

Figure 3 is a view looking down upon Figure 1 from the position of the line 3—3 in the direction of the arrows; while Figure 4 is a transverse sectional view taken on the line 4—4 in Figure 2.

Referring more particularly to the drawings, the numerals 10 indicate hooks adapted to receive a skid chain 30 in one of said hooks, according to the position of the wheel upon which it is to be mounted. The said hooks have bridge members 11, 11 integral therewith; said bridge members are also formed with shoulders 20, 20 adapted to engage the tire. Plates 12, 12 also adapted to engage the tire 13, are secured to said bridge members 11, 11. The bridge members 11, 11 have upwardly projecting, threaded endportions 14, 14 adapted to receive a right and left hand screw 15 therein; upon the center of said screw is mounted a stop member 16, the said screw is operated by a handle 17, and the screw and threaded endportions 14, 14, are embodied in a casing 18; the operation of said screw-arrangement presents nothing especially novel, as this specific construction is commonly known.

Side pieces 21, 21 are fixedly secured to the shoulders 20, 20 and engage the tire; said side pieces are provided with cross pieces 22, 22 at their lower ends adapted to form a grip upon the rim of the tire; in this connection a fastening arrangement, such as screws 23, 23 may be provided in order to secure said side pieces solidly to a tire during the attachment of a skid chain.

It will be understood that if the latter fastening means of my device is used the top part, that is the box with the screw-arrangement, may be omitted as in such instances the bridge portions 15, 15 are just connected together across the tire in any suitable manner.

The operation of my device is to the effect that one end of a skid chain is arranged in one of the hooks, according to the relative position of the same to the wheel, whereupon the latter is turned around and the ends of the skid chains are then fastened together, as the device is removed.

It is obvious that changes may be made in the form, construction and arrangement of the several parts, as shown, within the scope of the appended claims, without departing from the spirit of the invention, and I do not, therefore, wish to limit myself to the exact construction shown and described herein.

What I claim as new, and desire to secure by Letters Patent of the United States, is:

A device for mounting skid chains on an automobile tire, comprising a pair of hook members adapted to receive a skid chain, a bridge member integral with each of said hook members, shoulders and plates mounted on said bridge members and adapted to engage around the thread portion of a tire, depending side members fixedly secured to said shoulders and made to engage the sides of the tire, upwardly projecting portions upon said bridge members, and a bolt threadedly inserted through said portions to inter-connect said bridge members and adjustably clamp the hook members to the tire, a casing enclosing said upwardly projecting portions and bolt, and cross pieces fixedly secured to the lower ends of the side members, whereby to form a solid grip upon the rim of the tire.

HARRY J. KLEIN.

REFERENCES CITED

The following references are of record in the file of this patent:

UNITED STATES PATENTS

| Number | Name | Date |
| --- | --- | --- |
| 1,153,490 | Harris | Sept. 14, 1915 |
| 1,500,409 | Melton et al. | July 8, 1924 |
| 2,177,279 | Holub | Oct. 24, 1939 |
| 2,299,185 | Smola | Oct. 20, 1942 |